United States Patent
Crim et al.

(10) Patent No.: US 9,703,831 B2
(45) Date of Patent: Jul. 11, 2017

(54) CONTEXTUAL DISPLAY OF SAVED SEARCH QUERIES

(75) Inventors: Christopher Crim, San Jose, CA (US); David McKee, Newark, CA (US); Richard L. Kalman, San Jose, CA (US); Stephen Iremonger, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1403 days.

(21) Appl. No.: 12/350,176

(22) Filed: Jan. 7, 2009

(65) Prior Publication Data

US 2010/0161644 A1 Jun. 24, 2010

Related U.S. Application Data

(60) Provisional application No. 61/139,998, filed on Dec. 22, 2008.

(51) Int. Cl.
*G06F 17/30* (2006.01)

(52) U.S. Cl.
CPC .............. *G06F 17/30442* (2013.01)

(58) Field of Classification Search
CPC ............................... G06F 17/30442
USPC ......................... 707/705, 999.001
See application file for complete search history.

(56) References Cited

U.S. PATENT DOCUMENTS

| | | | |
|---|---|---|---|
| 7,188,100 B2 * | 3/2007 | De Bellis et al. | 707/706 |
| 7,340,451 B2 | 3/2008 | Sacco | |
| 7,424,486 B2 | 9/2008 | Whitman et al. | |
| 2002/0099701 A1 * | 7/2002 | Rippich | 707/5 |
| 2002/0133488 A1 * | 9/2002 | Bellis et al. | 707/6 |
| 2005/0086204 A1 | 4/2005 | Coiera et al. | |
| 2005/0131649 A1 | 6/2005 | Larsen et al. | |
| 2005/0203878 A1 * | 9/2005 | Brill et al. | 707/3 |
| 2005/0256852 A1 * | 11/2005 | McNall et al. | 707/3 |
| 2008/0071748 A1 * | 3/2008 | Wroblewski et al. | 707/3 |
| 2008/0184308 A1 | 7/2008 | Herrington et al. | |
| 2008/0275857 A1 | 11/2008 | Dettinger et al. | |
| 2009/0216718 A1 * | 8/2009 | Agrawal et al. | 707/3 |
| 2012/0239679 A1 * | 9/2012 | Gupta | 707/767 |

OTHER PUBLICATIONS

Manual entitled "FileMaker Pro 9's Users Guide", by FileMaker, Copyright 2007.*
Book entitled "FileMaker Pro 9: The Missing Manual" by Coffee et al., Published on Aug. 2, 2007.*

(Continued)

*Primary Examiner* — Mahesh Dwivedi
(74) *Attorney, Agent, or Firm* — Downey Brand LLP

(57) ABSTRACT

A computer-implemented method for contextually displaying saved search queries is disclosed. The method comprises: displaying a user interface comprising a layout, the layout being associated with one or more tables in a database; receiving from the user interface a request for stored search queries; upon receiving the request, identifying a plurality of stored search queries, each of the plurality of stored search query being associated with one or more tables in the database; and displaying a stored search query from the plurality of stored search queries if the one or more tables associated with the stored search query and the one or more tables associated with the layout include at least one table in common.

17 Claims, 10 Drawing Sheets

(56) References Cited

OTHER PUBLICATIONS

Book entitled "FileMaker Pro 9 Bible" by Cologon et al., Published on Mar. 24, 2008.*
Article entitled "New FileMaker 9 Product Line Delivers 30 Ease-of_Use Breakthroughs" by FileMaker, dated Jul. 10, 2007.*
Article entitled "FileMaker Pro 10 Tutorial" by FileMaker, Copyright 2007-2009.*
Screenshot of "FileMaker Pro 10 Tutorial" by FileMaker, Copyright 2007-2009.*
Sriram et al., "Toward a Session-Based Search Engine." Slide Presentation. Department of Computer Science, Univ. of Illinois, Urbana-Champaign, 2004, 18 pages.
Kamvar et al., "The Role of Context in Query Input: Using Contextual Signal to Complete Queries on Mobile Devices." 2004, 8 pages.

* cited by examiner

| Client ID | First Name | Last Name | Address1 | Address2 | City | State | Country |
|---|---|---|---|---|---|---|---|
| 1 | Mary | Smith | 123 Elm St | | New Yo | NY | USA |
| 2 | Michelle | Cannon | 123 4th St SW | | New Yo | NY | USA |
| 3 | Andre | Common | 147 White Avenue | | New Yo | NY | USA |
| 4 | Marie | Durand | 1 rue de la Poste | | New Yo | NY | USA |
| 5 | Jean | Durand | 1001 Place du Mon | | New Yo | NY | USA |
| 6 | Juan | Garcia | Calle Real Manzana | Colonia Aquimerq | New Yo | NY | USA |
| 7 | Jans | Jansen | Bradoade127 | | | | |
| 8 | William | Johnson | 852 Marsh Road | | | | |
| 9 | John | Lee | 123 St. John's Rd | | | | |
| 10 | Gerard | LeFranc | Chez Pierre | | | | |
| 11 | Ahmet | Mehmet | Bahar Caddes50 | | | | |
| 12 | Patrick | Murphy | 89 Lavenworth P | | | | |
| 13 | Le | Nguyen | 123 Place de la n | | | | |
| 14 | Kentaro | Ogawa | 2-23-5 Imachi | | | | |
| 15 | Jutta | Schmidt | Grosse Elbastras | | | | |
| 16 | Juanrta | Alvarez | 147 Houston Aver | | | | |
| 17 | John | Smith | 41 Mary St | | | | |
| 18 | Sven | Svensson | Klammerdammsg | | | | |
| 19 | Sophie | Tang | 126 Deepwater B | | | | |
| 20 | Julia | Varcas | Avenida Sevilla87 | | | | |
| 21 | Annelies | Verhaag | Blauwburgstraa8 | | | | |
| 22 | Matti | Virtanen | Matintie2 | | | | |
| 23 | Steve | Williams | 789 Ninth Avenue | | | | |
| 24 | Betty | Wilson | 456 Fifth Avenue | | | | |

Clients

*EveryWhere Travel*

Browse / Layout: Clients

Record: 1
Total: 12
Unsorted

1  Client ID
Mary  First Name
Smith  Last Name
123 Elm St  Address1
  Address2
New York  City
NY  State
USA  Country

| Model1-003 | 12/2/2005 |
| Model2-004 | 12/2007 |

Previous Purchases

FIG. 1

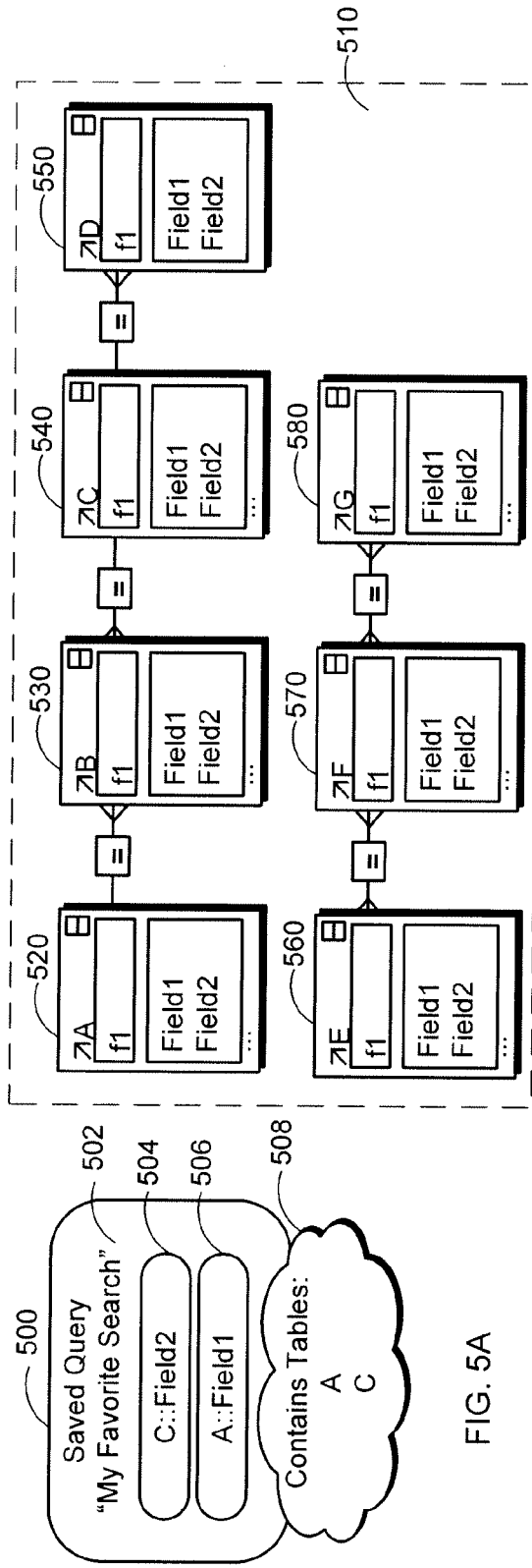
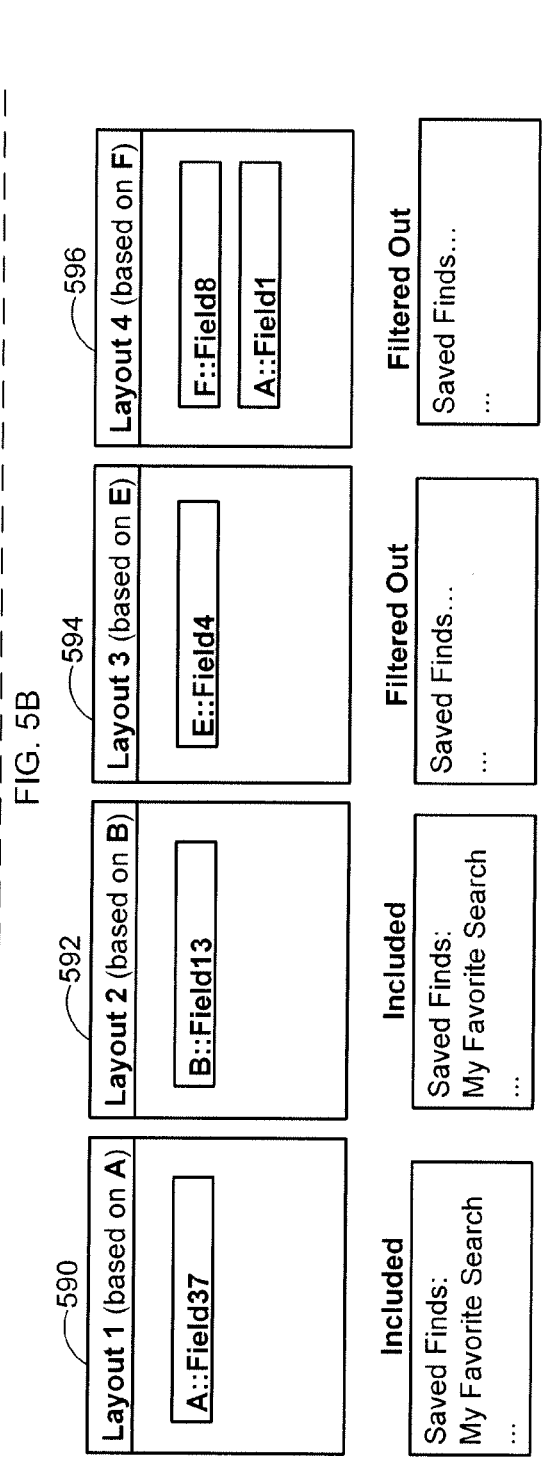
FIG. 5A
FIG. 5B
FIG. 5C

CONTEXTUAL DISPLAY OF SAVED SEARCH QUERIES

CROSS-REFERENCE TO RELATED APPLICATIONS

This application claims priority to U.S. Provisional Application No. 61/139,998, filed Dec. 22, 2008, the entire contents of which are hereby incorporated by reference.

TECHNICAL FIELD

The subject matter of this application is generally related to relational databases.

BACKGROUND

A database is a collection of information or data that one can organize, update, display, and manipulate (e.g., sorting, summing, etc.). Information in a database can be organized in tables, each table comprising one or more records, each record comprising one or more fields, and each field comprising a piece of information (a value). A database can consist of one file with one table, several files, each file containing one or more tables, or several files, each file containing one part of a table.

As an example, an online retailer's database can include separate tables for client information, inventory information, sales information, and so on. In the "Clients" table, a record can be created for each client, and each client record can contain fields such as "Client ID," "Name," "Address," "Phone Number," "Client Type," and so on. In the "Inventory" table, a record can be created for each product in the inventory, and each inventory record can contain fields such a "Product ID," "Description," "Unit Price," "Quantity," and so on. In the "Sales" table, a sales record can be created for each sales transaction, and each sales record can contain fields such as "Date of Transaction," "Product Sold," "Quantity Sold," "Client ID," "Payment Method," "Shipping Information," and so on.

Tables in a database can be related by one or more relationships, where each relationship can be specified by one or more matching criteria. A database comprising related tables is called a relational database. The set of relationships in a relational database can be built in a Relational Database Management System (RDBMS). A relational database can comprise one or more sets of related tables. For example, in an online retailer's database, one set of related tables can store information related to the sales department, another set of related tables can store information related to the human resources department, another set of related tables can store information related to the legal department, and so on.

Examples of RDBMSs include: Oracle®, Microsoft® SQL Server, MySQL® and FileMaker® Pro. FileMaker® Pro is a cross-platform database application that integrates a database engine with a graphical user interface for allowing users to manage a relational database by adding and deleting fields, records, and tables, create relationships between tables, and design layouts, screens and forms for presenting the data stored various tables and fields.

In a user interface for managing a relational database, a user can search the database and retrieve a specific set of records by submitting a search query specifying a set of search criteria. In some implementations, a search query is expressed in the form of one or more concurrent or consecutive search requests combined to narrow or expand the set of found records. A search request can comprise one or more search criteria, and each search criterion can comprise a data field, an operator, and a data value. For example, a search criterion can be specified as "Client::Client ID >1000" which returns all records in a table called "Client" that have a field "Client ID" whose value is "greater than" "1000."

Creation of complex search queries is difficult and tedious. A slight variation in the search criteria can produce a vastly different set of found records. Therefore, many database systems store previously submitted search queries and allow users to reuse them in a subsequent search in the same session or in a future session.

Although saved search requests sometimes help users to avoid recreating the same search queries, indiscriminate presentation of all saved search queries regardless of relevance can lead to confusion and inefficiency. For example, a user interested in searches related to sales does not benefit from having to sift through saved search queries that target data in tables only related to human resources information.

SUMMARY

A computer-implemented method for contextually displaying saved search queries is disclosed. The method comprises: displaying a user interface comprising a layout, the layout being associated with one or more tables in a database; receiving from the user interface a request for stored search queries; upon receiving the request, identifying a plurality of stored search queries, each of the plurality of stored search queries being associated with one or more tables in the database; and displaying a stored search query from the plurality of stored search queries if the one or more tables associated with the stored search query and the one or more tables associated with the layout include at least one table in common.

In some implementations, the one or more tables associated with the layout include a current table on which the layout is based and one or more tables related to the current table.

In some implementations, each of the one or more tables associated with the layout includes at least one field that appears on the layout.

In some implementations, the step for identifying a plurality of stored search queries, where each search query is associated with one or more tables, further comprises: identifying an object for each of the plurality of stored search queries in a file, each object specifying one or more search fields; and identifying one or more tables containing the one or more search fields as the one or more tables associated with the stored search query.

In some implementations, the method further comprises: for each of the plurality of stored search queries, determining whether the one or more tables associated with the stored search query and the one or more tables associated with the layout include at least one table in common; and displaying all stored search queries that have at least one associated table in common with the layout.

In some implementations, the method further comprises storing a search query as an object in a file, the object specifying one or more search fields and one or more tables containing the one or more search fields.

In some implementations, the stored search queries are saved by one or more users of a database management system.

In some implementations, the stored search queries are recently performed search queries that are saved by a database management system.

Other implementations are disclosed for contextual display of search queries, including implementations directed to systems, methods, apparatuses, computer-readable media, and user interfaces.

DESCRIPTION OF DRAWINGS

FIG. 1 shows an example database table and an example user interface displaying a layout of the database table.

FIG. 5A shows an example object for storing a database search query.

FIG. 5B shows an example relationship graph of a relational database.

FIG. 5C shows the result of contextual display of the saved search query in FIG. 5A for layouts based on different tables in FIG. 5B.

DETAILED DESCRIPTION

Database Application Overview

Figure 2B:
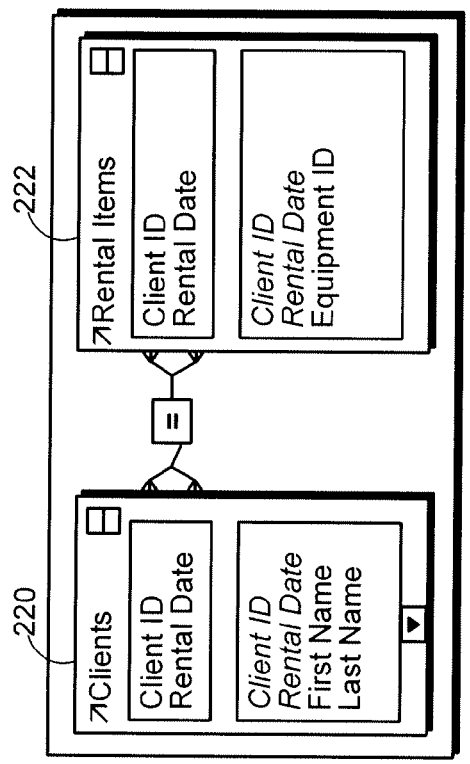
FIGS. 2A-2D show schematic representations of relationships between pairs of tables in a relational database.

FIG. 1 shows (on the left) an example table 100 in a database, where the table stores client information. The example table 100 contains eight data fields: a "Client ID" field 102, a "First Name" field 104, a "Last Name" field 106, an "Address 1" field 108, an "Address 2" field 110, a "City" field 112, a "State" field 114, and a "Country" field 116. Each row (e.g., row 118) of the example table 100 stores a client record identifiable by the "Client ID." Some of the fields in a data record can be empty.

FIG. 1 also shows (on the right) an example user interface 150 presenting a layout for displaying information stored in the database. This example user interface 150 contains a control area 152, and a layout area 154. The control area 152 comprises various user interface elements 156 for selecting different modes of operation, such as a browse mode, a find mode, a layout mode, and a preview mode. In some implementations, the browse mode is suitable for working with data records in the database, such as adding, viewing, changing, sorting, and deleting records. In some implementations, the find mode is suitable for searching for particular records that satisfy a set of search criteria. In some implementations, once a set of records are found according to a search request entered in the find mode, the user can return to the browse mode to work with the found set of records.

In some implementations, the layout mode provides user elements for designing one or more layouts for presenting data on screens, reports, labels, and forms. A user can select data fields from different data tables and other objects (e.g., documents, pictures, etc.) and arrange them on a layout.

The control area 152 can also include other user interface elements that are specific to a particular mode of operation that is currently selected. For example, in the browse mode, the control area 152 further includes a user interface element 158 for selecting a particular layout from a set of pre-designed layouts for viewing the client records; a user interface element 160 for browsing a set of records (e.g., records 1-12), and other user interface elements 162 and 164 for presenting information of the found records, such as total number of records found, and whether they are sorted or unsorted, etc.

In some implementations, the control area 152 can include user interface elements for presenting a list of saved search queries, a list of recent search queries, a menu for saving, editing, or managing saved or recent search queries, and so on. In some implementations, some or all of the user interface elements for conducting searches and managing saved or recent search queries can be disabled depending on the current operation mode.

In FIG. 1, the layout area 154 can present a layout comprising data fields 166, portals (e.g., portal 168), and other objects according a layout design. A data field can display a value of the field from one record. A portal can display data fields from multiple records. Other objects that can be included in a layout include text, graphical objects (such as a logo), documents, buttons, calculation fields, summary fields, and so on. A summary field and a calculation field are fields that can present information based on the data that are currently displayed on the layout. A user can design a layout by specifying each object, its position and related properties (e.g., font for a field) on a canvas in the layout mode. A different layout can be created for a different purpose. For example, mailing labels, invoices, forms, reports, and so on, can all have different layouts. A layout can present data from one record at a time (e.g., in a form view) or multiple records at the same time (e.g., in a table view).

In some implementations, each layout is based on a single table, called a "current table." The layout can also display fields from other tables related to the current table. In some implementations, each layout can also display data from so-called "global" fields in a table even if the table is not related to the current table. Data from related tables or global fields can be displayed in fields or in portals on the layout. More details regarding related tables are provided in the "Relational Database Overview" section.

In FIG. 1, the layout presented in the layout area 154 displays data from two tables: a current table and a related table. The current table is a "Clients" table. The related table is a "Sales" table. The "Sales" table relates to the "Clients" table by a match field "Client ID," and a match criterion, i.e., equal "Client ID" values. The data in the "Clients" table is displayed in fields 166 (i.e., "Client ID," "First Name," "Last Name," "Address 1," "Address 2," "City," "State," and "Country") on the layout, and data in the "Sales" table is displayed in a portal 168, called "Previous Transactions." In this example, the client record currently displayed on the layout has a "Client ID" of "1," and there are two sales records that have "Client IDs" of "1," therefore, the portal "Previous Transactions" lists fields ("Product" and "Date") from the two related sales records. When a user browses to the next record in the "Clients" table (i.e., the current table), the values displayed in the fields and the portal update accordingly.

Relational Database Overview

A relational database comprises related tables, where each table can be represented as a node in a relationship graph, connected to other tables by one or more relationships (i.e., one or more sets of matching criteria). Relational databases allow a user to access data in different tables from one layout and to work with the data dynamically, so that when the user changes data in one place, the changes are reflected in all places where the related data appears.

In a relational database, relationships can be established between pairs of tables. A relationship between a pair of tables can be specified as one or more matching criteria between one or more match fields of the pair of tables. In a relationship between a pair of tables, one table is called a "current table" and the other is called a "related table." A match field is a field in the current table and a field in a related field that each contains a value allowing access to matching records. Therefore, a match field is sometimes called a "key field." Each matching criterion compares the match field of a record in the related table to the match field of a record in the current table according to a relational operator (e.g., equals to, not equal to, greater than, less than, etc.), and if the match field values satisfy the matching criterion, the two records are related and becomes accessible from layouts based on either table. In other words, a user can access related data when the value(s) in the match field(s) on one side of the relationship compares successfully with the value(s) in the match field(s) on the other side of the relationship, according to the criteria established in the relationship.

In the example shown in FIG. 1, the "Clients" table is related to the "Sales" table by a match field "client ID" in both tables, and the matching criterion is that "client ID" in the "Clients" table is "equal to" "Client ID" in the "Sales" table. Therefore, all records with matching "Client IDs" from the two tables are related records of each other. A user can thus access data fields in the related records of the "Sales" table from layouts based on the "Clients" table, and vice versa.

In some implementations, a relationship can be established between a table and itself (i.e., a table can self join). A user can specify a field in the table as the match field for the table to self-join, and find subsets of records, each comprising records with a different common value for that field. For example, the user can specify a "Manager" field in an "Employees" table comprising employee records, and find records for a subset of employees having the same value for the "Manager" field as the employee record currently being displayed in the layout. In some implementations, an additional instance of a table is created in the database for establishing a self-join relationship, and each instance of the table has a unique identifier in the relationship graph.

FIGS. 2A-2D show schematic representations of various relationships between pairs of tables in a relational database.

Figure 2D:
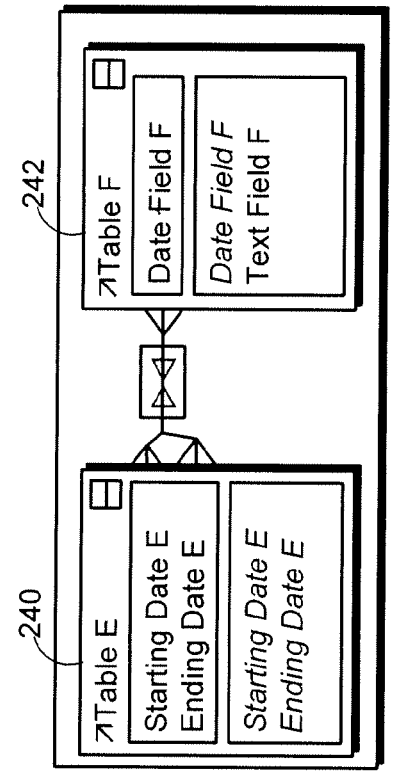
Figure 2A:
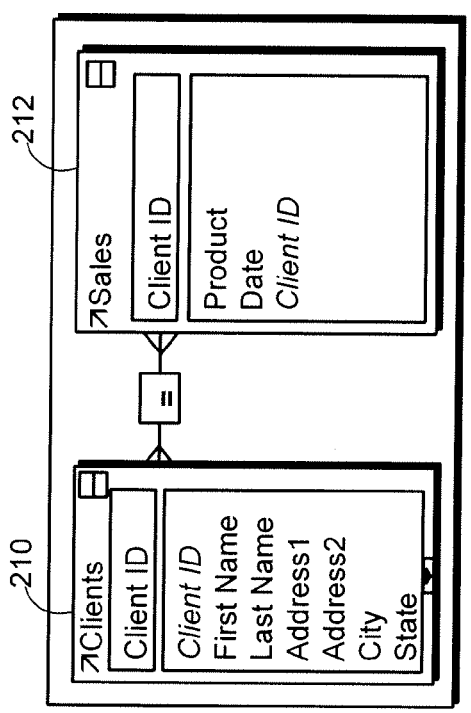

FIG. 2A shows a relationship between the "Clients" table 210 and the "Sales" table 212 as described above. A single match field (i.e., "Client ID") is specified for each table, with a single match criterion, i.e., "Client::Client ID=Sales:: Client ID."

Other more complex matching criteria can be specified. For example, in FIG. 2B, two match fields are specified for each table and two match criteria must be satisfied before a related record can be found. In this example, the current table is a "Clients" table 220, where each client record in the "Clients" table comprises a "Client ID" field, a "Rental Date" field, a "First Name" field, a "Last Name" field, and so on. The related table is a "Rental Items" table 222, where each rental item record comprises a "Client ID" field, a "Rental Date" field, and an "Equipment" field. The match fields in both tables are "Client ID" and "Rental Date." The relationship between the two tables are specified as "Clients::Client ID=Rental Items::Client ID" AND "Clients:: Rental Date=Rental Items::Rental Date." Therefore, all records having both matching "Client IDs" and "Rental Dates" are related records to each other. This relationship can, for example, be used to find and print out for each client separate invoices for each rental date.

Figure 2C:
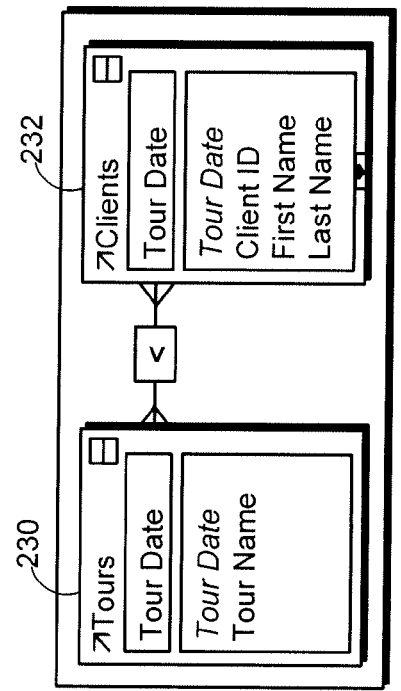

In FIG. 2C, the match fields in the current table and the related table are connected by a relational operator "less than." In this example, the current able is a "Tours" table 230 and the related table is a "Clients" table 232. Each tour record in the "Tours" table 230 comprises a "Tour Date" field and a "Tour Name" field. Each client record in the "Clients" table 232 comprises a "Tour Date" field, a "Client ID" field, a "First Name" field, a "Last Name" field, and so on. The relationship between the "Tours" table 230 and the "Clients" table 232 is specified as "Tours::Tour Date<Clients::Tour Date." All records in the "Client" table 232 that have "Tour Dates" before the "Tour Date" for a tour record in the "Tours" table 230 are related records of that tour record. This relationship can be used, for example, to find all clients who have a pending tour scheduled after the tour date for each of a set of tours in the "Tours" table 230.

FIG. 2D shows a relationship specified using two relational operators. The two relational operators can specify a range of values for a match field in the related table. In this example, the current table is a generic table E (240), and the related table is a generic table F (242). Each record in table E (240) comprises a "Start Date" field, and an "End Date" field. Each record in table F (242) comprises a "Date" field, and a "Text" field. The relationship between table E (240) and table F (242) is specified as "E::Start Date<F::Date" AND "E::End Date>F::Date." This relationship can be used to find all records in table F (242) that have "Date" values within the date range specified by a record in table E (240).

As shown in FIGS. 2A-2D, two tables can be joined directly by a relationship comprising one or more matching criteria. A table can also be self-joined. In some implementations, two tables can also become related through successive relationships with other intermediate tables. In some implementations, the relational database management system can provide a user interface for establishing relationships between tables in the database. The relationships can be represented by a relationship graph of the database. In a relationship graph, tables from one or more, internal or external database files can be presented. A relational database can comprise different sets of related tables, and the different sets of related tables can be represented as different sets of linked tables in a relationship graph. In some implementations, the database system can create multiple occurrences of a table with unique names to specify its position in different sets of linked tables. In some implementations, a relational database system can generate a background table that includes fields from two previously unrelated tables, and automatically and transparently relate the fields based on user input in a particular user interface (e.g., a layout user interface). More details regarding background tables can be found in the Example Background Table section.

Context of a Layout

As demonstrated with respect to FIGS. 2A-2D, relationships can be used to find related records that satisfy one or more matching criteria. Relationships provide access to data from one table to another in a relationship database. The access can be from one record in one table to one record in another table, from one record to many other records, or from all records in one table to all records in another table, depending on the criteria specified in the relationship. Because each additional relationship is an additional set of matching criteria that must be satisfied before the data in the related table can be accessed from the current table, each different current table provides a different view (or access point) into the database. Therefore, each table occurrence in the relationship graph establishes a "context" for a layout based on that table occurrence. Context is the point in the relationship graph from which a relationship is evaluated. Data records in related tables that are accessible from the layout through relationships therefore depend on the context of the layout (i.e., the current table of the layout).

Figure 3:
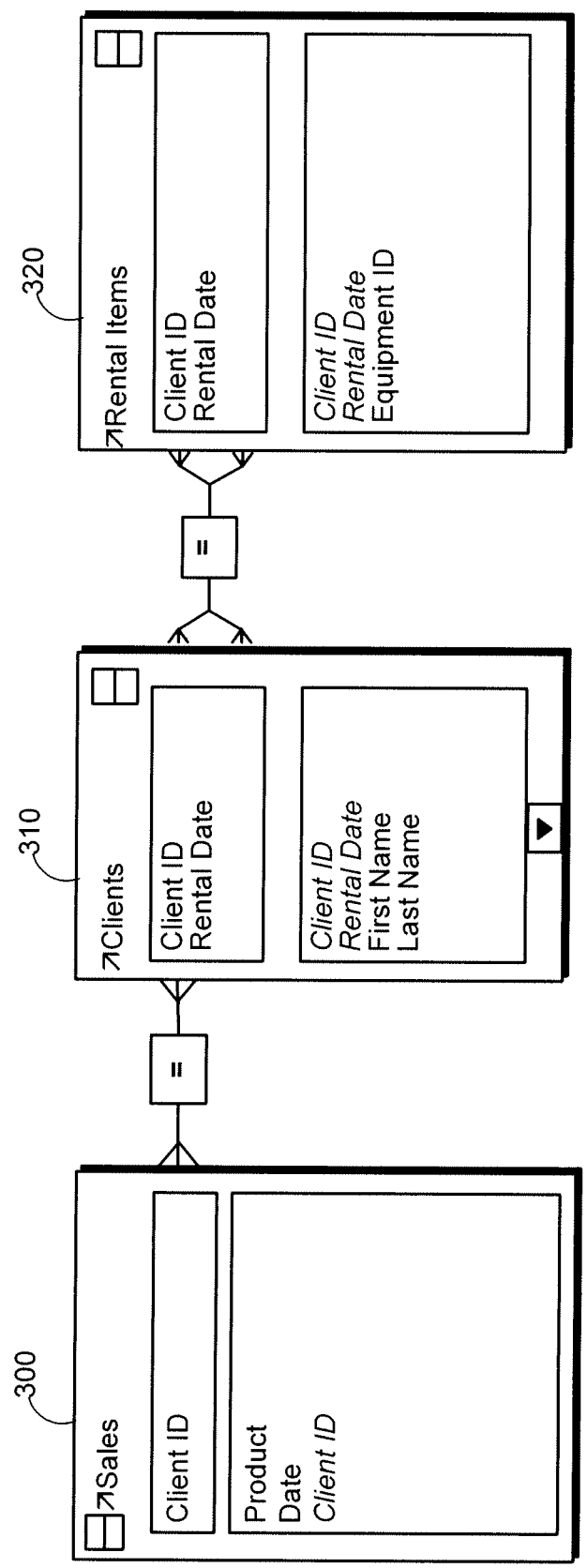
FIG. 3 shows a schematic representation of three linked tables in a relational database.

FIG. 3 shows an example relationship graph comprising three related tables "Clients," "Sales," and "Tours." The "Clients" table 310 is related to the "Sales" table 300 by a single match field "Client ID," and the "Clients" table 310 is related to the "Tours" table 320 by two match fields, "Client ID" and "Tour Date." Each table can establish a different context for a layout based on that table, and offers a different view into the relational database. For example, from a layout based on the "Clients" table 310, the records that are accessible include: all client records in the "Clients" table 310, all sales records having matching "Client IDs" in the "Sales" table 300, and all tour records having both matching "Client IDs" and matching "Tour Dates" in the "Tours" table 320. In contrast, from a layout based on the "Sales" table 300, the records that are accessible include: all sales records in the "Sales" table 300, all client records having matching "Client IDs" from the "Clients" table 310, and all tour records having "Client IDs" and "Tour Dates" matching those accessible client records. In further contrast, from a layout based on the "Tours" table 320, the records that are accessible include: all tour records in the "Tours" table 320, all client records having both matching "Client IDs" and matching "Tour Dates" from the "Clients" table 310, and all sales records having "Client IDs" matching those accessible client records. In each of these three layouts, the data records that are accessible from the layout can be slightly different since the relationships are evaluated from a different context (i.e., a different current table).

Associating a Search Query with Tables

Figure 4A:
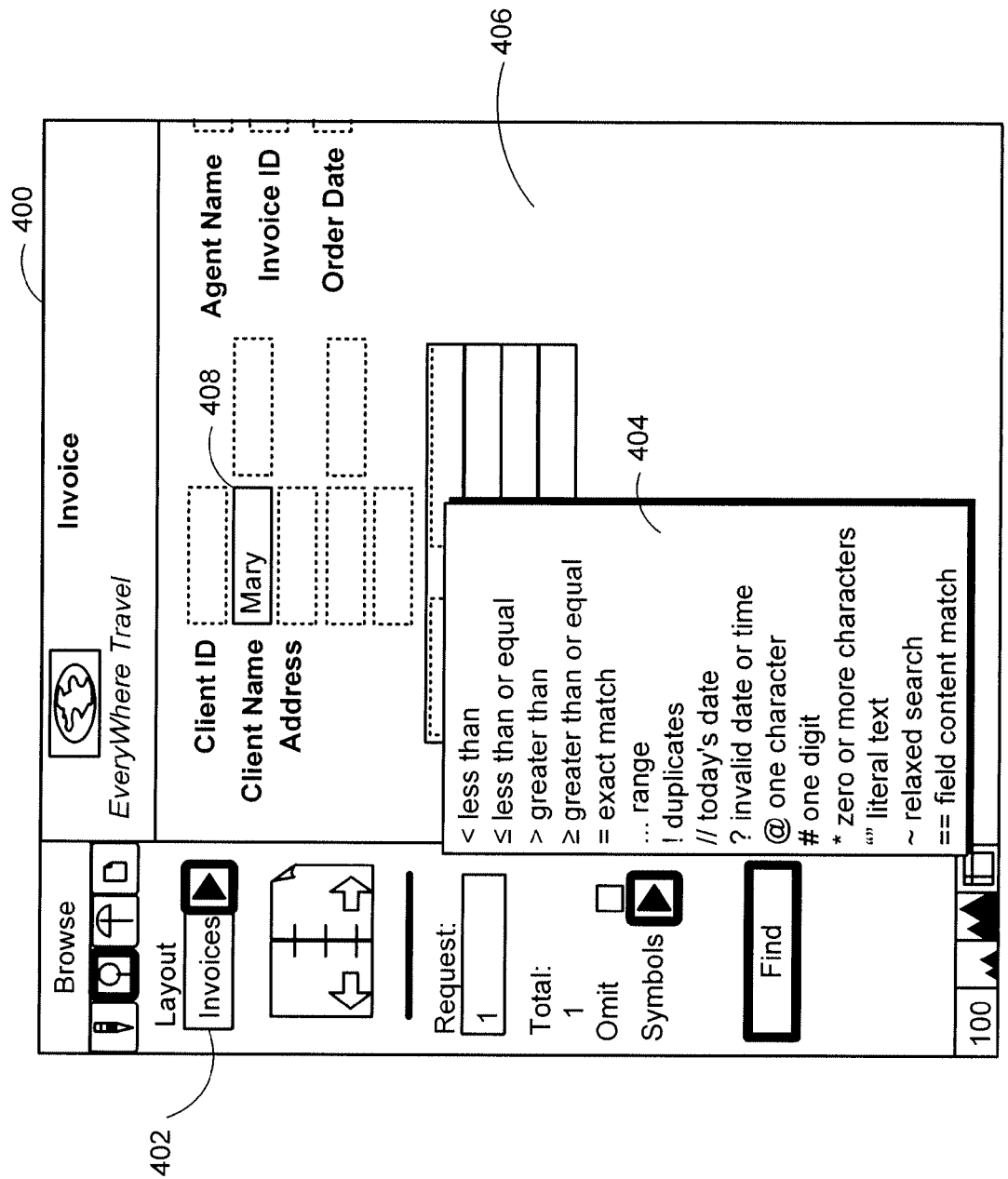
FIG. 4A shows an example user interface for specifying and submitting a search query in a database management system.

FIG. 4A shows an example user interface 400 for finding records in a database. Other methods for specifying and submitting search queries are possible, such as using command line input according to certain syntax rules, or search by key words, and so on.

In this example, the user interface 400 allows a user to select one or more layouts (e.g., from the drop down menu 402) that contain all the fields that the user wishes to search on. In some implementations, one or more search request forms (only one form 406 is shown in FIG. 4) are created based the selected layouts, where the user can specify desired values and search criteria in the empty fields (e.g., field 408) of the search request forms. For example, a user can specify text, numbers, dates, times, timestamps values, and so on for fields in the one or more search requests. A user can also specify ranges of values using operators such as "less than," "greater than," "numbers range from number x to number y," "dates range from date A to date B," and so on for fields of the search requests. Operators can be selected, for example, from a menu 404 in the user interface 400. In some implementations, a search request is based on a layout that contains portals or related fields showing data from one or more related tables. In such implementations, a user can further specify values and search criteria in the portals and related fields on the search request. Once a user has specified all the search fields and search criteria, the user can click on a "Find" button, and a search query is generated combining all the search criteria and search fields specified in all the search requests, and the search is performed.

Figure 4B:
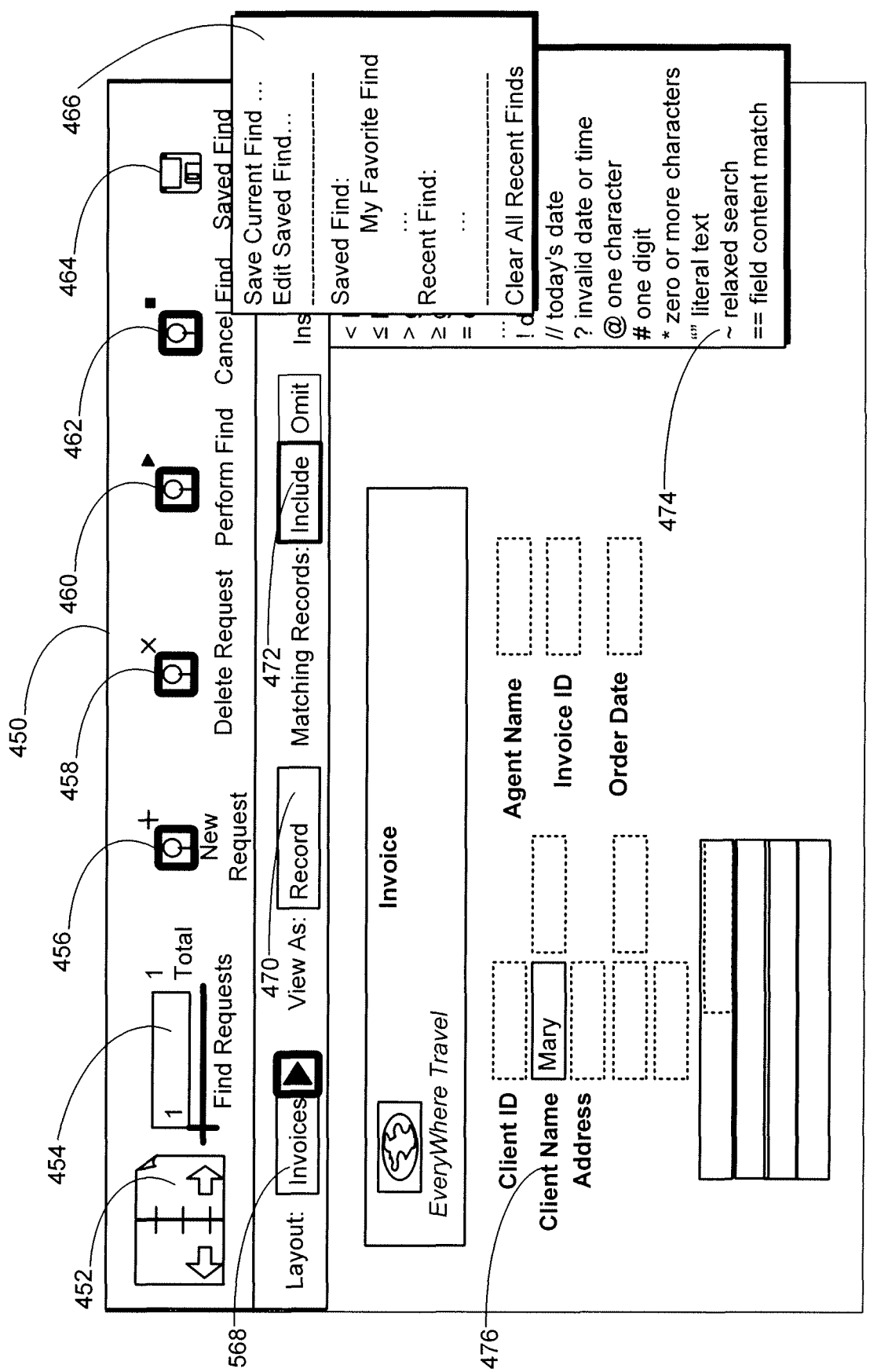
FIG. 4B shows another example user interface for specifying and submitting a search query in a database management system.

FIG. 4B shows another example user interface 450 for finding records in a database.

In some implementations, the user interface 450 includes a control area which further includes a plurality of user interface elements related to database queries. For example, the control area of user interface 450 includes: a user interface element 452 for browsing the search requests included in a search query, a user interface element 454 for displaying the total number of search requests included in the search query, a user interface element 456 for adding a new search request to the search query, a user interface element 458 for deleting an existing search request from the search query, a user interface element 460 for performing the search query once all the search requests included the search query have been specified, a user interface element 462 for cancelling a search query, and a user interface element 464 for presenting previously stored search queries. In this example, when a user selects the user interface element 464, a drop down menu 466 appears and displays menu items for saving the current search query, editing stored search queries, displaying a list of saved search queries, displaying a list of recent search queries, clearing the list of recent search queries, and so on.

The user interface 450 can also include a control area that further comprises user interface elements for specifying a search request included the search query. In the example user interface 450, the control area includes: a user interface element 568 for selecting a layout on which the search request is based, a user interface 470 for selecting a view of the layout for the search request (e.g., a form view), a user interface element 474 for specifying whether to include or omit records matching the search criteria from the found set of records, a user interface element (not shown) for selecting and inserting a search operator in a search criterion from a list of search operators 474.

The user interface 450 can also include an area for displaying a search request form 476. In this example, the search request form 476 is an empty form based on the "Invoice" layout, as specified in the user interface element 568. A user can specify one or more search criteria in one or more fields of the search request form (e.g., by entering "Mary" in the "Client Name" field). Once all desired search criteria in all search request forms included in the search query are specified, a user can click on the user interface element 460 (i.e., the "Perform Find" button) to perform the search according to all search criteria specified in the search requests included in the search query.

There are a number of ways that a search query can be associated with a set of tables in the database. Because a search query can include search requests based on one or more layouts, and each layout is based on a table (e.g., the current table for the layout), in some implementations, the search query can be associated with the current tables of these one or more layouts. Alternatively, because a search query contains search fields from one or more tables, the search query can be associated with the one or more tables that contain the search fields of the search query. In some implementations, the search query can further be associated with tables that are related to the one or more tables containing the search fields of the search query. The decision as to which set of tables should be associated with a search query can be based on which set of tables are associated with a layout as discussed in the section for "Contextual Display of Saved Search Queries."

Storing Saved Search Queries

In some implementations, a database management system hosting the database can save search queries previously submitted by a user. In some implementations, each search query is stored as an object or a data structure in a file (e.g., in a "recent queries" file, a "saved queries" file, or a combined file). In some implementations, each stored search query is assigned a unique identifier, or name, in the file. The unique identifier or name can be user specified or system generated. For example, a user can explicitly save a search query that has proven to be effective in a user interface provided by the database management system, e.g., through a "Save Search Query . . . " menu selection and a dialogue box. In some implementations, the user can specify a name for the search query in the dialogue box, or accept a system generated name. In some implementations, where the system automatically saves a list of recently performed search queries (e.g., as a list of "Recent Search Queries" or "Recent Finds"), the system automatically generates and assigns a unique identifier to each recent search query. The list of stored recent search queries can be updated as users continue to enter new search queries. In some implementations, the set of stored search requests (i.e., saved/recent search queries) can be edited by a user in a user interface. In some implementations, a user can create and save new search queries based on previously saved search queries through, for example, an "edit saved queries" user interface. The number of "recent" or "saved" search queries to be stored or presented can be independently specified by the user or by the system. In some implementations, the saved queries or recent queries stored in the file are grouped according to user IDs or account IDs. In some implementations, the saved queries or recent queries can be sorted or unsorted according to date, user ID, and/or an associated table, etc.

In some implementations, the object for each saved or recent search query is a data structure containing information regarding the search criteria and the associated tables of the search query. The search criteria can comprise a name (or an "ID") and type of each search field (i.e., field to be searched), the value, values, or value ranges for each search field, the operator used to compare values in a data record against the value, values, or value ranges specified, and the table containing each of the search fields. In some implementations, the search criteria can be specified as a set of SQL commands for carrying out the search specified by the search query. In some implementations, the associated tables include tables containing at least one search field specified in the search query. In some implementations, the associated tables further include tables that are related to those tables that contain at least one search field specified in the search query. In some implementations, the associated tables are specified for each search query object in the file. In some implementations, the associated tables are deduced from the search fields specified in the search query object.

Contextual Display of Saved Queries

In some implementations, the database management system can display a user interface element in the control area of the user interface for selecting a saved or recent query from a list of saved or recent queries (e.g., as shown in FIG. 4B). In some implementations, only the saved or recent queries that are relevant to the current layout are displayed for user selection. In some implementations, the relevancy of a saved or recent search query is determined based on a match between the tables associated with the layout and the tables associated with the saved or recent search queries. Filtering of the list of saved or recent search queries based on a layout's context (i.e., current table) and related tables before they are displayed ensures that only relevant search queries are displayed. This contextual display of saved/recent search queries saves the users from having to sift through the entire list of saved/recent search queries to find one that is suitable for searches from the present layout. In some implementations, the user interface elements for contextual display of saved/recent search queries are available only in operation modes that are associated with a layout (e.g, browse mode, or find mode), which is in turn associated with a current table (or context).

FIGS. 5A-5C demonstrate an example implementation and results of the method for contextual display of saved search queries. In this particular implementation, a saved query is stored as an object 500 in a list of saved search queries, as shown in FIG. 5A. The object has a unique identifier or name 502, "My Favorite Search." The object 500 also contains search criteria (504 and 506) for two fields, i.e., Table C::Field 2 and Table A::Field 1. The object 500 further contains information (508) of the tables associated with the search query, i.e., Table A and Table C. In this particular implementation, the associated tables are those that contain at least one search field specified in the search query. The information (508) can be explicitly specified and stored in the object 500, or be deduced from the search criteria (504 and 506) at the time of query filtering.

In this particular example, the database contains two sets of related tables, as shown by the relationship graph 510 in FIG. 5B. The first set of related tables includes tables A, B, C, and D (i.e., tables 520, 530, 540, and 550, respectively); and the second set of related tables includes tables E, F, and G (i.e., tables 560, 570, and 580, respectively).

FIG. 5C shows four layouts (i.e., layouts 590, 592, 594, and 596). Each of the four layouts is based on table A, B, E, and F, respectively. In this particular example, the associated tables for each layout include the layout's current table and the tables that are related to the layout's current table. Therefore, the associated tables for layouts 1 and 2 include tables A, B, C, and D. The associated tables for layouts 3 and 4 include tables E, F, and G. Even though layout 4 displays a field from table A, table A is not considered as an associated table for layout 4 in this particular implementation because table A is not related to the current table (i.e., table F) of layout 4. By comparing the associated tables of the search query "My Favorite Search" and the associated tables for each layout, "My Favorite Search" is displayed when a user invokes the saved query list from layouts 1 or 2, and is not displayed when the user invokes the saved query from layouts 3 or 4.

FIG. 5 demonstrates one implementation of the method. In some implementations, the associated tables of the layout can include all tables that contain at least one field displayed on the layout. In some implementations, the associated tables can further include tables that are related to at least one table that contains at least one field displayed on the layout. In such implementations, the associated tables for layout 4 would include table F and table A, and all their related tables, which are tables E, G, B, C, and D. In such implementations, "My Favorite Search" would be displayed from layout 4 because two common tables (i.e., tables A and C) can be found between the associated tables of the layout and the associated tables of the search query.

Figure 6:
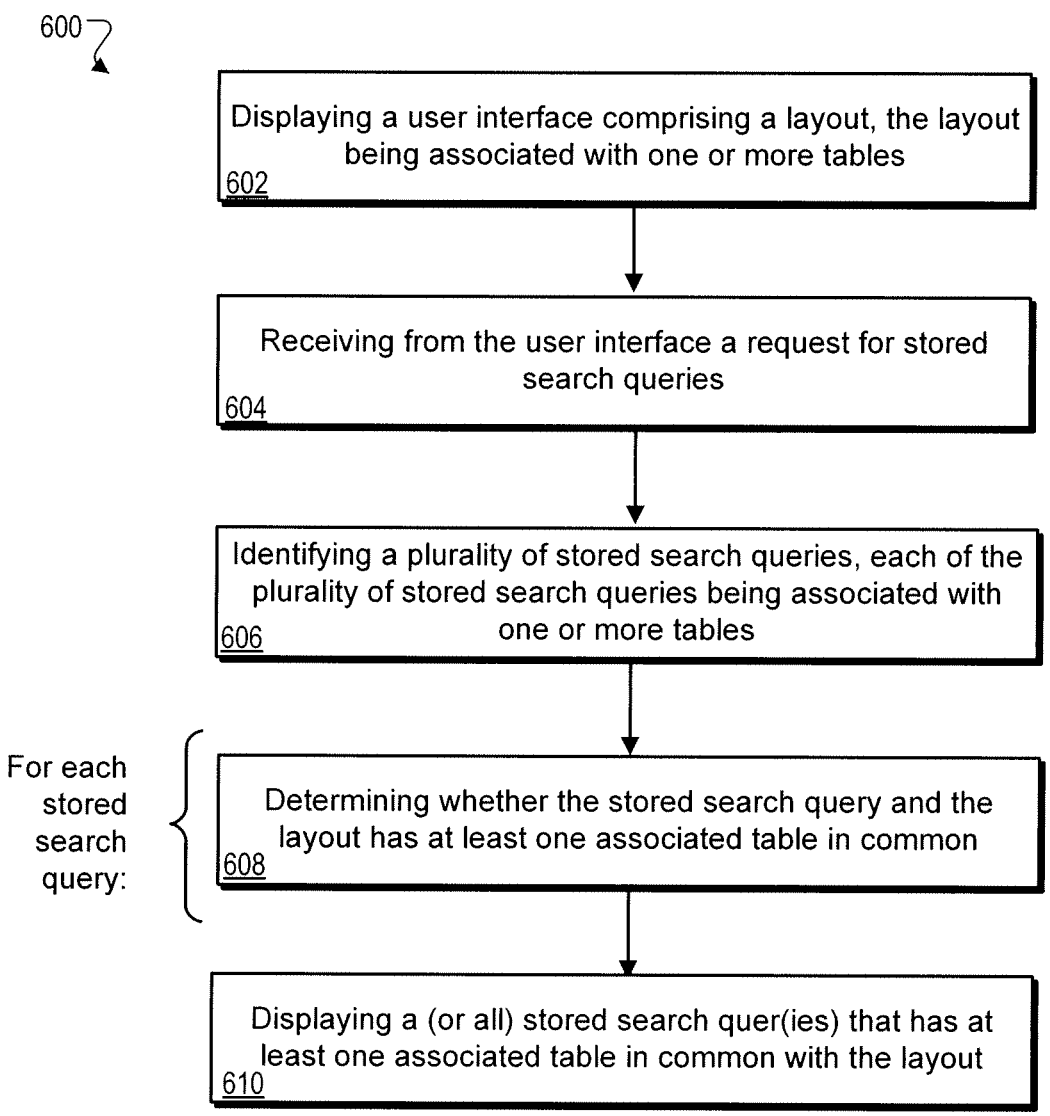
FIG. 6 is a flow diagram of an example process for contextual display of saved search queries in a relational database management system.

FIG. 6 is a flow diagram of an example process 600 for contextually display saved/recent search queries base on the layout. The process 600 can be implemented by a database management system. The example process 600 includes: a step 602 for displaying a user interface comprising a layout, where the layout is associated with one or more tables; a step 604 for receiving from the user interface, a request for stored search queries; a step 606 for identifying a plurality of stored search queries, where each of the plurality of stored search queries is associated with one or more tables. Then, for each of the plurality of stored search queries, the process 600 further comprises: a step 608 for determining whether the stored search query and the layout has at least one associated table in common. Then, the process further comprises: a step 610 for displaying all search queries that have at least one associated table in common with the layout.

In some implementations, the user interface displayed in step 610 can be a user interface for the browse mode. In some implementations, the one or more tables associated with the layout can include the current table on which the layout is based. In some implementations, the one or more tables associated with the layout can further include tables related to the current table of the layout through one or more relationships in the database. In some implementations, the one or more tables associated with the layout include tables that contain at least one field that appears on the layout (either as fields or in portals). In some implementations, the one or more tables associated with the layout can further include tables that are related to at least one table that contains at least one field that appears on the layout (either as fields or in portals).

In step 620, after a user submits a request to see a stored list of search queries from the user interface comprising the layout, the database management system can identify the layout in the user interface, and then identify one or more tables associated with the layout by checking the data fields and portals on the layout and/or the relationship graph of the database.

In step 630, the database management system can identify/retrieve a list of stored search queries from a file. In some implementations, the queries are stored as objects in the file. In some implementations, the database system also identifies the user or account ID of the current session, and only identifies/retrieves the stored query objects specific to this user or account ID. In some implementation, each object specifies one or more search fields. In some implementations, the database management system can determine the one or more associated tables for the each stored search query based on the one or more search fields specified in the object of the search query. In some implementations, the one or more associated tables include tables that contain at least one search field specified in the object. In some implementations, the one or more associated tables can further include tables that are related to at least one table that contains at least one search field specified in the object.

In some implementations, where the one or more associated tables for a search query only include those tables containing at least one searched field specified in the search query, the one or more associated tables for a layout can include the current table of the layout and all other tables related to the current table. In some implementations, where the one or more associated tables for a search query include those tables containing at least one search field specified in the search query and also all tables that are related to at least one of those tables, then the one or more tables related to the layout can include just the current table of the layout.

In step 640, the database management system compares the one or more associated tables of each stored search query and to the one or more associated tables of the layout, and filters out (or hides) those stored search queries that do not have any associated table in common with the layout.

In step 650, the database system presents the filtered list of stored search queries, where each stored search query presented to the user has at least one associated table in common with the layout. Therefore, a smaller list of stored search queries are presented, and this filtered list of stored search queries are also more likely to be relevant to the search the user wishes to perform from the current layout.

In some implementations, a user can select a saved query from the list of saved queries presented, and the same query can be executed according to the search criteria or search commands stored in the stored query object. In some implementations, the stored search query can be saved by one or more users of the database management system. In some implementations, the stored search queries are recently performed search queries that are saved by the database management system.

Example Database Architecture

Figure 7:
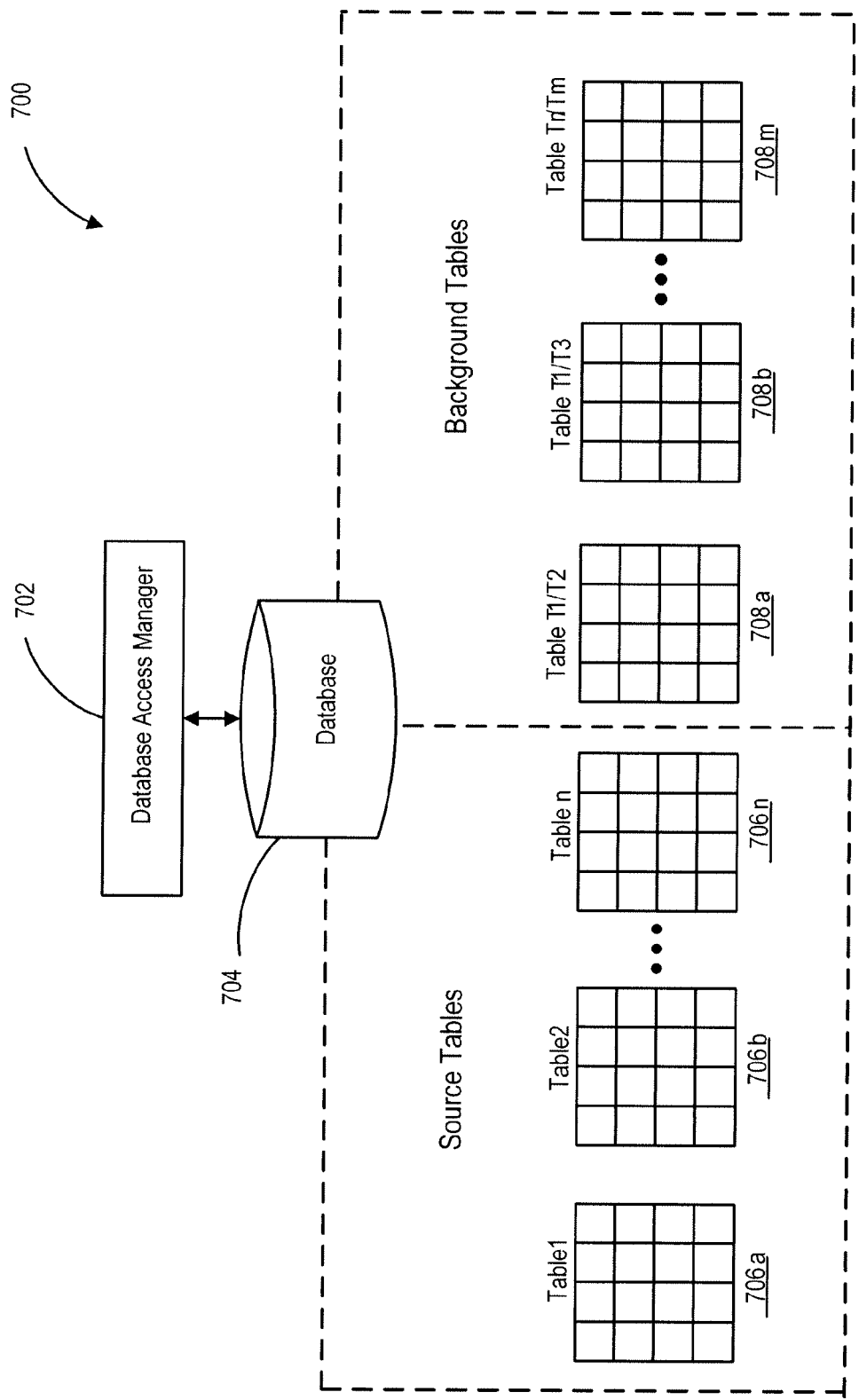
FIG. 7 is a block diagram of an example relational database management system.

FIG. 7 is a block diagram showing a generic database architecture 700. In general, the database architecture 700 provides a data abstraction between one or more source tables 706a-706n and user actions relating to the source tables 706. Typically, the data abstraction is transparent to the user of a database application.

In some implementations, the database architecture 700 includes a database access manager 702. The database access manager 702 provides an interface between the database application, or other applications, and the database 704. For example, the database access manager 702 can handle database queries including structure query language (e.g., MySQL®) queries, and other types of queries. Moreover, the database access manager 702 can handle the creation of new database tables. For example, a new table can be created through a create command (e.g., SQL CREATE TABLE statement).

The database 704 is used to store information, typically in the form of source tables. The database 704 can include any number of source tables. In the example shown, the database 704 includes source tables 706a through 706n, where n is a positive integer. The database 704 can also include any number of background tables. In the example shown, the database 704 includes background tables 708a through 708m, where m is a positive integer.

The background tables 708 can store data relationships and additional or extended fields to related records. The background tables 708 can be automatically and transparently created by the database access manager 702 in response to user triggered events (e.g., a drag and drop event in a layout design interface, or a linking event in a relationship graph user interface). In some implementations, users of the database application are not allowed access to the background tables 708 and thus cannot directly access or modify the contents of the background tables 708.

Example Background Table

Figure 8:
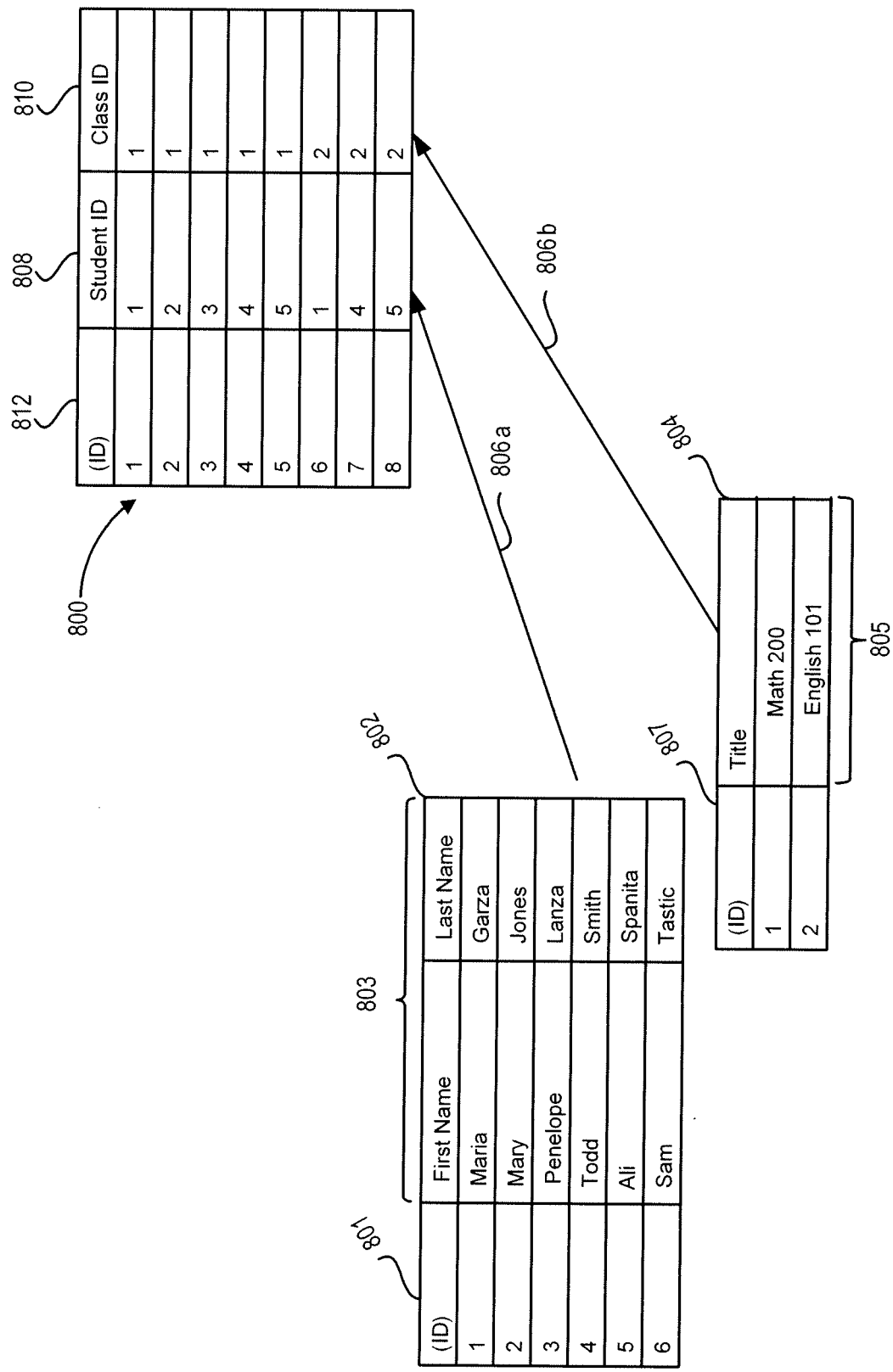
FIG. 8 shows an example background table linking two tables in a relational database.

FIG. 8 is a block diagram showing an example background table 800 that can be used to store relationship information. In some implementations, the background tables 708 can be created by joining one or more source tables 706 to specify data relationships. For example, consider two source tables 802 and 804 which include data fields 803 and 805, respectively. In addition, the tables 802 and 804 include identifiers 801 and 807, respectively, for each record. These identifiers can be hidden from the user. Thus, even though the tables 802 and 804 include identifiers, the database application can display data 803 and 805 without the identifiers.

As illustrated by arrows 806a and 806b, the database application can store the relationship information by performing a join operation on tables 802 and 804 (e.g., using an SQL Join command). This creates the background table 800 where the student IDs are associated with the class IDs. For example, the student IDs 801 can be stored in the student ID field 808 and the class IDs 807 can be stored in the class ID field 810 of the background table 800 in order to relate the records from each source that the user has associated by specifying a relationship.

In some implementations, the database application can also store added field information in background table 800. For example, the database application can add additional or extended fields (not shown) to the background table 800 that specifies assignments and/or teaches for each class. The values of the additional fields can be specified by user input or from related tables of the two source tables.

Example System Architecture

Figure 9:
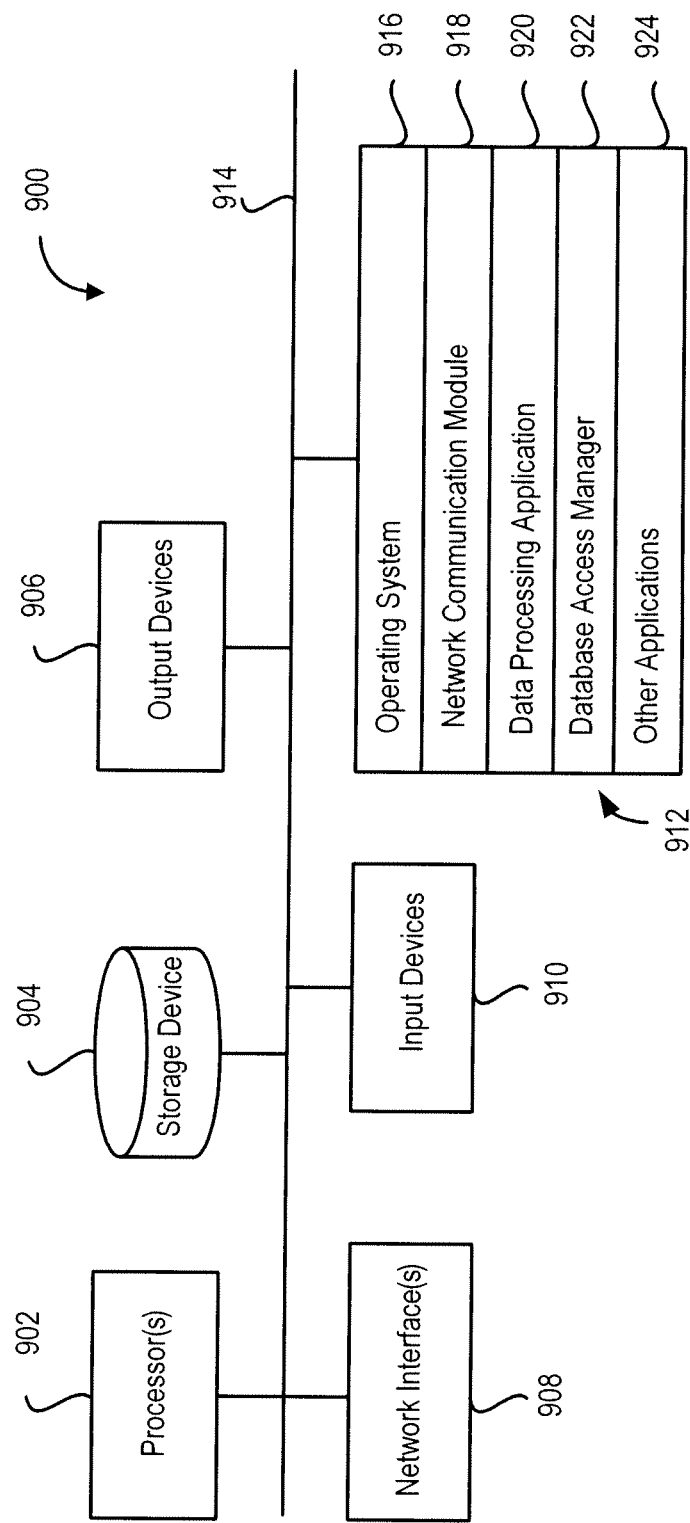
FIG. 9 is a block diagram of an example computer system implementing a relational database management system

FIG. 9 is a block diagram showing a generic computing architecture 900 (e.g., a personal computer) that can be used to implement a database management system and the method for contextually display of stored search queries, as described in reference to FIGS. 1-8. The architecture 900 generally includes one or more processor(s) 902, one or more storage device(s) 904 (e.g., hard disk, optical disk, CD-ROM), one or more output devices 906 (e.g., display device), one or more network interface(s) 908 (e.g., Ethernet card, WAN adapter, USB port), one or more input devices 910 (e.g., mouse, keyboard), and memory 912 (e.g., RAM, ROM). The memory 912 may include an operating system 916, a network communication module 1418, one or more data processing application 920 (e.g., an RDBMS), a database access manager 902, and one or more other applications 924. Each of these components can be operatively coupled to one or more buses 914 for transferring and receiving instructions, addresses, data, and control signals.

In some implementations, the database management system 920 can be a cross-platform database application that integrates a database engine with a graphical user interface for allowing users to modify a database by dragging new elements into layouts, screens, and forms that provide the user interface. The database management system 920 interacts with the database access manager 922 to implement the features and operations described in reference to FIGS. 1-8.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, a data processing apparatus. The computer-readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The data apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications may be made to the disclosed implementations and still be within the scope of the following claims.

What is claimed is:

1. A computer-implemented method, comprising:
    displaying a user interface comprising a layout, the layout being associated with one or more first tables in a database and specifying a layout design for presenting selected data in the one or more first tables;
    receiving a user request for stored search queries;
    in response to receiving the user request:
        identifying, by a processor, a plurality of stored search queries, wherein each of the plurality of stored search queries is associated with one or more respective second tables in the database;
        determining, by the processor, from among the plurality of stored search queries, at least a first stored search query, wherein the respective second tables associated with the first stored search query and the one or more first tables associated with the layout have at least one table in common; and
        displaying, from among the plurality of stored search queries, the determined first stored search query with the layout.

2. The computer-implemented method of claim 1, wherein the one or more first tables associated with the layout include a current table on which the layout is based and one or more third tables related to the current table.

3. The computer-implemented method of claim 1, wherein each of the one or more first tables associated with the layout includes at least one field that appears on the layout.

4. The computer-implemented method of claim 1, further comprising identifying the one or more respective second tables for each of the plurality of stored search queries, the identifying further comprises:
    identifying an object for the stored search query in a file, each object specifying one or more search fields; and
    identifying one or more tables containing the one or more search fields as the one or more respective second tables associated with the stored search query.

5. The computer-implemented method of claim 1, further comprising:
    storing a search query as an object in a file, the object specifying one or more search fields and one or more tables containing the one or more search fields.

6. The computer-implemented method of claim 1, wherein the stored search queries are saved by one or more users of a database management system.

7. The computer-implemented method of claim 1, wherein the stored search queries are recently performed search queries that are saved by a database management system.

8. A non-transitory computer-readable medium having instructions stored thereon, which, when executed by at least one processor, cause the processor to perform operations comprising:
    displaying a user interface comprising a layout, the layout being associated with one or more first tables in a database and specifying a layout design for presenting selected data in the one or more first tables;
    receiving a user request for stored search queries;
    in response to receiving the user request:
        identifying a plurality of stored search queries, wherein each of the plurality of stored search queries is associated with one or more respective second tables in the database;

determining from among the plurality of stored search queries, at least a first stored search query, wherein the respective second tables associated with the first stored search query and the one or more first tables associated with the layout have at least one table in common; and displaying, from among the plurality of stored search queries, the determined first stored search query with the layout.

9. The non-transitory computer-readable medium of claim 8, wherein the one or more first tables associated with the layout include a current table on which the layout is based and one or more third tables related to the current table.

10. The non-transitory computer-readable medium of claim 8, wherein each of the one or more first tables associated with the layout includes at least one field that appears on the layout.

11. The non-transitory computer-readable medium of claim 8, wherein the operations further comprise identifying the one or more respective second tables for each of the plurality of stored search queries, the identifying further comprises:

identifying an object the stored search query in a file, each object specifying one or more search fields; and identifying one or more tables containing the one or more search fields as the one or more respective second tables associated with the stored search query.

12. The non-transitory computer-readable medium of claim 8, wherein the operations further comprises:

storing a search query as an object in a file, the object specifying one or more search fields and one or more tables containing the one or more search fields.

13. A system comprising:

one or more processors;

memory coupled to the one or more processors and operable for storing instructions, which, when executed by the one or more processors, causes the one or more processors to perform operations, comprising:

displaying a user interface comprising a layout, the layout being associated with one or more first tables in a database and specifying a layout design for presenting selected data in the one or more first tables;

selecting at least a first stored search query from a plurality of stored search queries, wherein each of the plurality of stored search queries is associated with one or more respective second tables in the database, and wherein the respective second tables associated with the first stored search query and the one or more first tables associated with the layout have at least one table in common; and displaying the first stored search query with the layout in response to a user request for stored search queries.

14. The system of claim 13, wherein the one or more first tables associated with the layout include a current table on which the layout is based and one or more third tables related to the current table.

15. The system of claim 13, wherein each of the one or more first tables associated with the layout includes at least one field that appears on the layout.

16. The system of claim 13, wherein the operations further comprise identifying the one or more respective second tables for each of the plurality of stored search queries, the identifying further comprises:

identifying an object for the stored search query in a file, each object specifying one or more search fields; and identifying one or more tables containing the one or more search fields as the one or more respective second tables associated with the stored search query.

17. The system of claim 13, wherein the operations further comprise:

storing a search query as an object in a file, the object specifying one or more search fields and one or more tables containing the one or more search fields.

* * * * *